United States Patent [19]

Sonnenerg

[11] Patent Number: 5,041,465
[45] Date of Patent: Aug. 20, 1991

[54] REDUCING LUSTROUS CARBON IN THE LOST FOAM PROCESS

[75] Inventor: Fred M. Sonnenerg, Merion, Pa.

[73] Assignee: Arco Chemical Technology, Inc., Wilmington, Del.

[21] Appl. No.: 583,122

[22] Filed: Sep. 17, 1990

[51] Int. Cl.$^5$ .............................................. C08J 9/232
[52] U.S. Cl. ........................................ 521/58; 164/45; 264/DIG. 15; 521/60
[58] Field of Search ................................... 521/58, 60; 264/DIG. 15; 164/45

[56] References Cited

U.S. PATENT DOCUMENTS 4,393,146  7/1983  Rigler et al. ........................... 521/58
4,418,156  11/1983 Rigler et al. ........................... 521/58

Primary Examiner—Morton Foelak
Attorney, Agent, or Firm—Lewis J. Young

[57] ABSTRACT

The evaporative casting of molten metals has been shown to produce casting having smooth surfaces with significantly less sign of carbon deposits thereon by using a polystyrene containing a high temperature peroxide, tert-butyl cumyl peroxide.

3 Claims, No Drawings

REDUCING LUSTROUS CARBON IN THE LOST FOAM PROCESS

BACKGROUND OF THE INVENTION

The present invention is directed to an improved process for producing metal castings using the lost foam casting process.

Lost Foam Casting (Full Mold Casting) involves placing a plastic pattern of the desired cast part in sand and then pouring molten metal onto the plastic casting causing it to vaporize. The molten metal exactly reproduces the plastic pattern to provide the ultimate casting. Many patents have issued covering the Lost Foam Casting process.

It is known that polystyrene, the major polymer used in this application, produces surface defects when casting iron due to carbon residues left by the polymer. When casting low carbon steel the carbon formed from the polystyrene dissolves in the metal degrading the properties of the cast part. A number of patents describe variations in the Lost Foam Casting process that are intended to minimize the residues left by the polymer after the metal has been poured. Most of these variations involve changing the coating on the pattern or changing the flask in which the casting is made. For example, U.S. Pat. Nos. 4,448,235 and 4,482,000 describe a variable permeability casting designed to avoid entrapment of polymer vapors in the casting. U.S. Pat. No. 3,572,421 describes a flask containing many air breathing holes to allow the escape of polymer degradation products to decrease the formation of carbon. Similarly, U.S. Pat. Nos. 3,842,899, 3,861,447 and 4,612,968 describe the addition of vacuum to the casting flask to aid in the removal of the polymer residues.

The Dow Chemical Company has reported the development of a polymethyl methacrylate foam bead useful to replace polystyrene for the casting process. (Moll and Johnson, "Eliminate the Lustrous Carbon Defect With New Moldable Foam", Evaporative Foam Casting Technology II Conference, Nov. 12–13, 1986, Rosemont, Ill.). Although this polymer reduces residues left on the cast part, it carries with it other disadvantages. The higher glass transition temperature (130° C.) of the polymer causes longer molding cycles when preparing patterns. It uses a Freon blowing agent which has been shown to cause corrosion of molds. It also rapidly gives off a large volume of gas when castings are made. It is very difficult to control the evolution of gas and often the molten metal is blown back out of the flask.

There is still a great need for a polymer that provides the advantages of polystyrene but produces no carbon defects. U.S. Pat. Nos. 4,773,466 and 4,763,715 teach to use polycarbonate copolymers and terpolymers, respectively, to make patterns for the lost foam casting process.

BRIEF SUMMARY OF THE INVENTION

We have now developed a process for the preparation of a polystyrene suitable for Lost Foam Casting applications. Pre-expanded beads prepared from polystyrene containing from 0.50 to 1.50 percent of tert-butyl cumyl peroxide can be used in conventional steam molding equipment to produce low density patterns. Iron castings made from the polystyrene/peroxide material show significantly less signs of lustrous carbon defects. The polystyrene smoothly and controllably decomposes to give a smooth, clean casting.

DETAILED DESCRIPTION OF THE INVENTION

The polymers useful in the present invention include polystyrene having a molecular weight of 150,000 to 300,000.

Preparation of low density, strong uniform patterns with good surface finish requires small spherical beads of polymer having bead diameters between 100 and 1000 microns, preferably between 200 and 500 microns. The beads, once formed, are impregnated with blowing agent by a process similar to that used for polystyrene as described in U.S. Pat. No. 2,983,692 issued to Koppers Company. The beads are suspended in an aqueous suspension containing finely divided calcium phosphate and an anionic surfactant. Any of a number of low boiling blowing agents such as butane, n-pentane, isopentane, cyclopentane, hexane, carbon dioxide, Freon 11, Freon 113, Freon 114, Freon 22, or mixtures of these is then added, and the suspension is sealed and heated to 95°–135° C. for 2–6 hours. During the impregnation, a high temperature peroxide, tert-butyl cumyl peroxide, is added in amounts between 0.5 and 1.5 weight-percent. The use of high temperature peroxide is necessary to prevent its decomposition during the normal expansion and molding of the casting.

After impregnation the beads are acid washed and air dried to remove water. The blowing agent incorporation is determined by weighing a sample of dry beads before and after subjecting them to 130° C. for 2 hours. The weight loss under these conditions corresponds to the blowing agent level. Typically 5–15 weight percent of blowing agent can be incorporated into the beads.

The impregnated beads are then pre-expanded to about 0.5 to 2 pounds per cubic foot (pcf) by subjecting them to atmospheric steam. The lowest density beads are obtained using vacuum expansion as described by Immel (U.S. Pat. No. 3,577,360). Using these techniques 0.8 to 1.2 pcf beads are obtained. A typical expansion/cooling cycle requires 3 minutes. Following pre-expansion the beads are aged to allow for equilibration of gas pressure within the foam cells.

The expanded, aged beads are molded into the desired pattern using techniques similar to those described by Stastny in U.S. Pat. No. 2,787,809. The mold cavity is charged with pre-expanded, aged beads Steam is then injected into the mold to cause the particles to fill voids and fuse to form a single pattern. The mold is then cooled until the pattern can be removed without distortion.

The molded patterns are attached, using a hot-melt adhesive, to runners and a down-sprue to allow the molten metal to travel from the top of the flask to the pattern. The pattern and runners are then coated with a refractory such as an aqueous silica suspension and allowed to dry. The coated pattern is then placed on a bed of loose sand in the casting flask and covered with loose, unbonded sand leaving only the top of the down-sprue exposed for metal pouring. The sand is then compacted around the pattern by vibration of the casting flask.

Molten grey iron at 1427° C. is then poured onto the down-sprue. The molten metal flows into the flask, vaporizing the polymer and forming the cast part. After the flask is allowed to cool for approximately ten minutes the sand and casting are dumped out of the flask.

The casting is an exact replica of the polymer pattern with a smooth surface with significantly less signs of carbon deposits.

The following examples are meant to illustrate, but not limit the invention.

EXAMPLE I

Fine granular polystyrene beads with a size range of 200 to 500 microns and having a molecular weight of 225,000 were impregnated with a mixture of pentanes by placing 100 cc of distilled water, 2.0 g of tricalcium phosphate, 2.0 g of a 1% aqueous solution of sodium dodecylbenzene sulfonate, and 0.1 g polyoxyethylene(20)-sorbitan monolaurate, 0.23 g of paraffin wax together with 100 g of polymer beads and 7.8 g of pentanes in an 8 oz citrate bottle. If peroxide was added, the peroxide was added at this time. The bottles were capped and heated in an oil bath with agitation for ¾ hr. to 105° C. and maintained at 105° C. for 2 hours. The bottle was then cooled, opened and the polymer was separated from the aqueous layer. The beads were then washed with 100 cc of 0.1N HCl to remove residual phosphate salts, centrifuged and tray dried.

The impregnated beads were lubed with Silene-732D from PPG Co., and pre-expanded in a Drispander made by Kohler General Corporation. They were then aged at least one day.

The beads were then injected into a ¾"×5¾"×13¾" plaque mold and heated to 100° C. with steam to expand and fuse. Following cooling for 2 minutes the pattern was ejected from the mold to provide a smooth surface, resilient pattern with good mechanical strength.

The pattern was then attached to a runner system and sprue with Styro Bond 52.3 Hot Melt Adhesive from Thiem Corporation. The runner and sprue system was also prepared using the copolymer. An identical polystyrene pattern was also attached to the same sprue with a separate runner. The pattern was then coated with Styro Kote Refractory Coating (a silica based aqueous coating from Thiem Corp.) and allowed to dry overnight. The assembled pattern was then packed with loose sand into a casting flask and the sand was compacted using a General Kinematics Compaction Table.

Five patterns were made from each of six compositions as follows:

| Sample | Density | Additive |
|--------|---------|----------|
| A | 0.90 | 0.50% tert-Butyl Cumyl Peroxide |
| B | 0.80 | 1.25% tert-Butyl Cumyl Peroxide |
| C | 1.05 | 0.50% Di-tert-butyl Peroxide |
| D | 0.95 | 1.25% Di-tert-Butyl Peroxide |
| E | 1.00 | None |
| F | 1.35 | None (PS Mol. Wt. = 280,000) |

Molten grey iron at 1427° C. was then poured onto the sprue to fill the patterns and evaporate the polymers. After cooling for 10 minutes, the castings were dumped out of the flask. The relative rankings of the casting surfaces are shown in Table I.

TABLE I

| Ranking | Sample | Ranking | Sample |
|---------|--------|---------|--------|
| 1 | B | 16 | E |
| 2 | C | 17 | E |
| 3 | B | 18 | D |
| 4 | B | 19 | C |
| 5 | E | 20 | D |
| 6 | C | 21 | C |
| 7 | C | 22 | B |
| 8 | A | 23 | D |
| 9 | A | 24 | A |
| 10 | B | 25 | D |
| 11 | A | 26 | F |
| 12 | E | 27 | F |
| 13 | D | 28 | F |
| 14 | E | 29 | F |
| 15 | A | 30 | F |

Ranking 1 has the least amount of lustrous carbon
Ranking 30 has the most amount of lustrous carbon The castings produced using the higher molecular weight polystyrene patterns (F) showed obvious pitting and lustrous carbon on the surface. The use of the tert-butyl cumyl peroxide showed significant improvement over all the other additives. As is seen from Table I, Sample B had four of the five samples ranked in the top 10. In contrast, the patterns produced using di-tert-butyl peroxide (C and D) showed no improvement over the lower molecular weight polystyrene (E).

We claim:
1. A process for preparing a pattern for use in making metal castings which have significantly less residual carbon on the surface comprising
   (a) adding from 0.5 to 1.50 percent of tert-butyl cumyl peroxide to a polystyrene having a molecular weight of about 150,000 to 300,000 and having a bead size between 200 and 500 microns in diameter;
   (b) suspending said particles in water using a suitable suspending agent system;
   (c) adding a suitable blowing agent to the suspension and heating to impregnate the particles;
   (d) separating the impregnated beads from the aqueous suspension, washing and drying the beads;
   (e) pre-expanding the beads by subjecting to atmospheric steam to obtain a density of about 0.5 to about 2 pounds per cubic foot;
   (f) aging the beads; and
   (g) molding the beads into the desired pattern having a density of about 2.0 pcf or less.
2. The process of claim 1 wherein said suitable suspending agent system is a finely divided calcium phosphate and an anionic surfactant.
3. The process of claim 1 wherein said suitable blowing agent is selected from the group consisting of butane, n-pentane, isopentane, cyclopentane, hexane, carbon dioxide, and the fluorinated hydrocarbons and mixtures of these.

* * * * *

UNITED STATES PATENT AND TRADEMARK OFFICE
CERTIFICATE OF CORRECTION

PATENT NO.  : 5,041,465
DATED       : August 20, 1991
INVENTOR(S) : Fred M. Sonnenberg It is certified that error appears in the above—identified patent and that said Letters Patent is hereby corrected as shown below:

ON THE TITLE PAGE:  Item [75]
Correct name of inventor to read Fred M. Sonnenberg

Signed and Sealed this

Twelfth Day of January, 1993

Attest:

DOUGLAS B. COMER

*Attesting Officer*      *Acting Commissioner of Patents and Trademarks*